(12) United States Patent
Hatanaka et al.

(10) Patent No.: US 10,493,842 B2
(45) Date of Patent: Dec. 3, 2019

(54) CAPLESS OIL FEEDER AND MANUFACTURING METHOD THEREFOR

(71) Applicant: Sumitomo Riko Company Limited, Aichi (JP)

(72) Inventors: Kazuki Hatanaka, Aichi (JP); Lin Jiang, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 41 days.

(21) Appl. No.: 15/838,336

(22) Filed: Dec. 11, 2017

(65) Prior Publication Data

US 2018/0099559 A1    Apr. 12, 2018

Related U.S. Application Data

(63) Continuation of application No. PCT/JP2017/003729, filed on Feb. 2, 2017.

(30) Foreign Application Priority Data

Feb. 22, 2016  (JP) ................................. 2016-031422

(51) Int. Cl.
*B60K 15/04*    (2006.01)
*B67D 7/04*    (2010.01)
(Continued)

(52) U.S. Cl.
CPC ................ *B60K 15/04* (2013.01); *B67D 7/04* (2013.01); *B60K 2015/0346* (2013.01);
(Continued)

(58) Field of Classification Search
CPC ............ B60K 15/04; B60K 2015/0429; B60K 2015/048; B60K 2015/0346;
(Continued)

(56) References Cited

U.S. PATENT DOCUMENTS 5,071,018 A * 12/1991 Moore ............. B60K 15/03519
220/86.2
7,806,135 B2    10/2010 Kaneko
(Continued)

FOREIGN PATENT DOCUMENTS

JP    H06183271    7/1994
JP    2000203278    7/2000
(Continued)

OTHER PUBLICATIONS

"Written Opinion of the International Searching Authority (Form PCT/ISA/237)" of PCT/JP2017/003729, dated Apr. 11, 2017, with English translation thereof, pp. 1-10.
(Continued)

*Primary Examiner* — Matthew W Jellett

(74) *Attorney, Agent, or Firm* — JCIPRNET

(57) ABSTRACT

An oil filler port of the capless oil feeder includes: an oil filler port main body made of a resin, a breather tube portion made of the resin, and a flap valve. The oil filler port main body has a tubular shape and includes a nozzle insertion port for inserting an oil filler nozzle at one end and a fuel feed port for supplying fuel to a filler tube at the other end. The breather tube portion is formed integrally on an outer side of a peripheral surface of the oil filler port main body and connected to a breather tube. The flap valve is foamed to be insertable from the fuel feed port, and is disposed inside the oil filler port main body to close the nozzle insertion port and is opened by insertion of the oil filler nozzle.

9 Claims, 5 Drawing Sheets

(51) Int. Cl.
　　　*B67D 7/46* (2010.01)
　　　*B60K 15/03* (2006.01)

(52) U.S. Cl.
　　　CPC .. *B60K 2015/047* (2013.01); *B60K 2015/048* (2013.01); *B60K 2015/0429* (2013.01); *B60K 2015/0461* (2013.01); *B67D 7/46* (2013.01)

(58) Field of Classification Search
　　　CPC ...... B60K 2015/047; B60K 2015/0461; B67D 7/04; B67D 7/46
　　　See application file for complete search history.

(56) References Cited

U.S. PATENT DOCUMENTS

| | | | |
|---|---|---|---|
| 9,340,105 | B2 | 5/2016 | Hagano |
| 9,394,157 | B2 | 7/2016 | Kito et al. |
| 9,751,397 | B2 | 9/2017 | Kito et al. |
| 2008/0017254 | A1 | 1/2008 | Kaneko |
| 2011/0240640 | A1 | 10/2011 | Hagano |
| 2014/0319161 | A1 | 10/2014 | Kito et al. |
| 2015/0343898 | A1 | 12/2015 | Kito et al. |
| 2017/0203650 | A1* | 7/2017 | Nakaya ................ B60K 15/035 |

FOREIGN PATENT DOCUMENTS

| | | |
|---|---|---|
| JP | 2003080959 | 3/2003 |
| JP | 2008045733 | 2/2008 |
| JP | 2011213128 | 10/2011 |
| JP | 2014008871 | 1/2014 |
| JP | 2014177264 | 9/2014 |
| JP | 5605340 | 10/2014 |
| JP | 2014213761 | 11/2014 |
| JP | 2015182688 | 10/2015 |
| JP | 2015221653 | 12/2015 |
| JP | 2015223988 | 12/2015 |
| WO | 2015146922 | 10/2015 |
| WO | 2015178060 | 11/2015 |

OTHER PUBLICATIONS

"International Search Report (Form PCT/ISA/210) of PCT/JP2017/003729", dated Apr. 11, 2017, with English translation thereof, pp. 1-5.

"Office Action of Japan Counterpart Application", dated Aug. 29, 2019, with English translation thereof, pp. 1-8.

* cited by examiner

CAPLESS OIL FEEDER AND MANUFACTURING METHOD THEREFOR

CROSS-REFERENCE TO RELATED APPLICATION

This application is a Continuation of PCT International Application No. PCT/JP2017/003729 filed on Feb. 2, 2017, which claims priority under 35 U.S.C § 119(a) to Patent Application No. 2016-031422 filed in Japan on Feb. 22, 2016, all of which are hereby expressly incorporated by reference into the present application.

BACKGROUND

Technical Field

The disclosure relates to a capless oil feeder and a manufacturing method therefor.

Description of Related Art

Japanese Patent Publication No. 2014-213761, Japanese Patent Publication No. 2014-177264, Japanese Patent No. 5605340, and Japanese Patent Publication No. 2014-8871 disclose capless oil feeders. The oil feeder disclosed in these documents includes a tubular passage forming member, a support member disposed on a side of the passage forming member where a nozzle is to be inserted, and a flap valve supported by the support member to be opened and closed. The support member is inserted from the side of the passage forming member where the nozzle is to be inserted, so as to be attached to the passage forming member. Because the support member is disposed at one end of the passage forming member, the boundary part therebetween could be a permeation path for fuel. Therefore, it is necessary to seal between the support member and the passage forming member. In terms of the sealing methods, there are a method of welding the two members and a method of interposing a sealing member therebetween.

In the case of welding, however, high welding accuracy is needed in order to ensure sealing between the support member and the passage forming member. Consequently, the costs of manufacturing by welding are high. On the other hand, in the case where a sealing member is provided, the part costs and assembly costs increase because of the sealing member.

SUMMARY

The disclosure provides a capless oil feeder having a configuration that does not require welding or sealing with a sealing member, and a manufacturing method therefor.

The capless oil feeder according to an exemplary embodiment of the disclosure includes an oil filler port made of a resin, a filler tube connected to the oil filler port, and a breather tube connected to the oil filler port.

The oil filler port includes an oil filler port main body made of the resin, a breather tube portion made of the resin, and a flap valve. The oil filler port main body has a tubular shape and includes a nozzle insertion port for inserting an oil filler nozzle at one end and a fuel feed port for supplying fuel to the filler tube at the other end. The breather tube portion is formed integrally on the outer side of the peripheral surface of the oil filler port main body and is connected to the breather tube. The flap valve is formed to be insertable from the fuel feed port, and is disposed inside the oil filler port main body to close the nozzle insertion port and is opened by insertion of the oil filler nozzle.

The capless oil feeder includes the oil filler port main body that supports the flap valve and is connected to the filler tube. The oil filler port main body is integrally formed. In other words, the support member that supports the flap valve and the passage forming member in the related art correspond to the integrally formed oil filler port main body of the disclosure. In other words, the oil filler port main body of the disclosure is integrally formed, as compared with the related art where the support member and the passage forming member are formed separately. Since the oil filler port main body is formed integrally, it is not required to carry out sealing by welding and sealing with a sealing member. As a result, elimination of the need for sealing can reduce the production costs.

In addition, the manufacturing method of the capless oil feeder according to an exemplary embodiment of the disclosure includes: integrally forming the oil filler port main body and the breather tube portion; and inserting the flap valve from the fuel feed port to dispose the flap valve inside the oil filler port main body. According to the manufacturing method of the exemplary embodiment of the disclosure, the capless oil feeder described above can be manufactured reliably.

Figure 1:
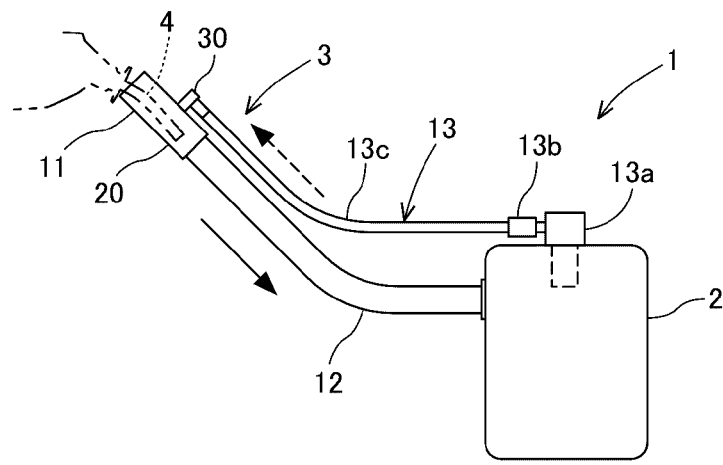
FIG. 1 is a diagram of the fuel line.

DESCRIPTION OF THE EMBODIMENTS (1. Configuration of the Fuel Line 1)

The configuration of a fuel line 1 is described with reference to FIG. 1 as an exemplary embodiment of the disclosure. The fuel line 1 refers to a line from an oil filler port 11 to an internal combustion engine (not shown) in an automobile. Nevertheless, in this exemplary embodiment, the area from the oil filler port 11 to a fuel tank 2, i.e., a part of the fuel line 1, is described.

The fuel line 1 at least includes the fuel tank 2 and a capless oil feeder 3. The fuel tank 2 stores liquid fuel, such as gasoline. The liquid fuel stored in the fuel tank 2 is supplied to the internal combustion engine (not shown) and used for driving the internal combustion engine.

The capless oil feeder 3 includes the oil filler port 11 made of a resin, a filler tube 12, and a breather line 13. The oil filler port 11 is disposed near the outer surface of the automobile for inserting an oil filler nozzle 4. The oil filler port 11 is a capless oil filler port that does not have an oil feeding cap. The oil filler port 11 at least includes an oil filler port main body 20 and a breather tube portion 30.

The filler tube 12 connects the oil filler port main body 20 of the oil filler port 11 and the fuel tank 2. When the oil filler nozzle 4 is inserted into the oil filler port 11 and liquid fuel is supplied from the oil filler nozzle 4, the liquid fuel flows through the filler tube 12 and is stored in the fuel tank 2. Here, when the liquid fuel fills the fuel tank 2, the liquid fuel is stored in the filler tube 12 and contacts the tip of the oil filler nozzle 4, by which the supply of the liquid fuel from the oil filler nozzle 4 is stopped automatically (auto stop function).

The breather line 13 connects the fuel tank 2 and the breather tube portion 30 of the oil filler port 11. The breather line 13 is a line for discharging fuel vapor in the fuel tank 2 to the outside of the fuel tank 2 as the liquid fuel is supplied to the fuel tank 2 via the filler tube 12.

The breather line 13 includes a cut valve device 13a, a connector 13b, and a breather tube 13c. The cut valve device 13a is disposed at the upper portion of the fuel tank 2, and when the cut valve device 13a is in an open state, the fuel vapor in the fuel tank 2 is discharged toward the side of the oil filler port 11. The cut valve device 13a includes a connection pipe made of a metal. The connector 13b is coupled to the connection pipe of the cut valve device 13a. The connector 13b is, for example, the connector as disclosed in Japanese Patent No. 3775656, or has a configuration formed by removing the flow control valve from the connector. In other words, the connector 13b is disposed to be detachable from the connection pipe of the cut valve device 13a. The breather tube 13c connects the connector 13b and the oil filler port 11.

Moreover, when the fuel tank 2 is full and the auto stop function is activated during oil feeding, the liquid fuel is circulated from the fuel tank 2 to the oil filler port 11 via the breather tube 13c. In this manner, the breather tube 13c circulates the fuel vapor during oil feeding and the liquid circulated fuel at the time of auto stop.

(2. Configuration of the Capless Oil Feeder 3)

The detailed configuration of the capless oil feeder 3 as shown in FIG. 1 is described with reference to FIG. 2 to FIG. 5. However, the detailed configuration of the positive pressure relief valve 50 that constitutes the capless oil feeder 3 will be described later.

The capless oil feeder 3 includes the oil filler port 11, the filler tube 12, and the breather line 13, as described above. The detailed configuration of the oil filler port 11, the filler tube 12, and the breather tube 13c is described hereinafter.

Figure 2:
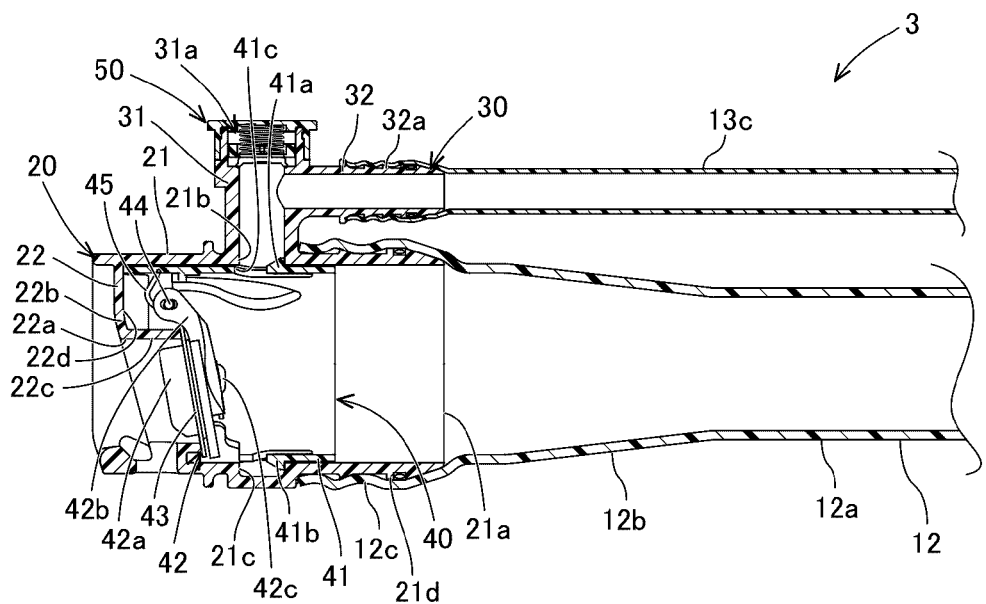
FIG. 2 is a cross-sectional view of the capless oil feeder in the axial direction.
Figure 3:
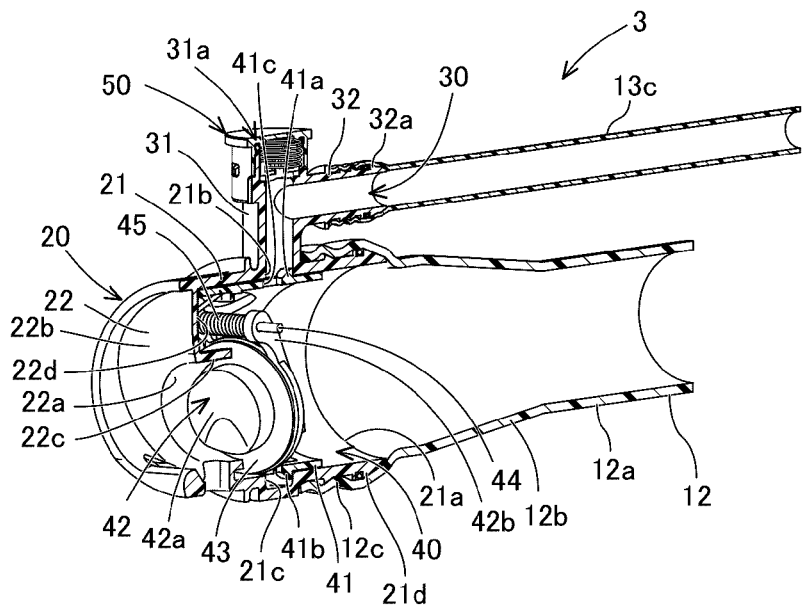
FIG. 3 is a perspective view of the capless oil feeder cut in the axial direction, as viewed from the side of the nozzle insertion port.
Figure 4:
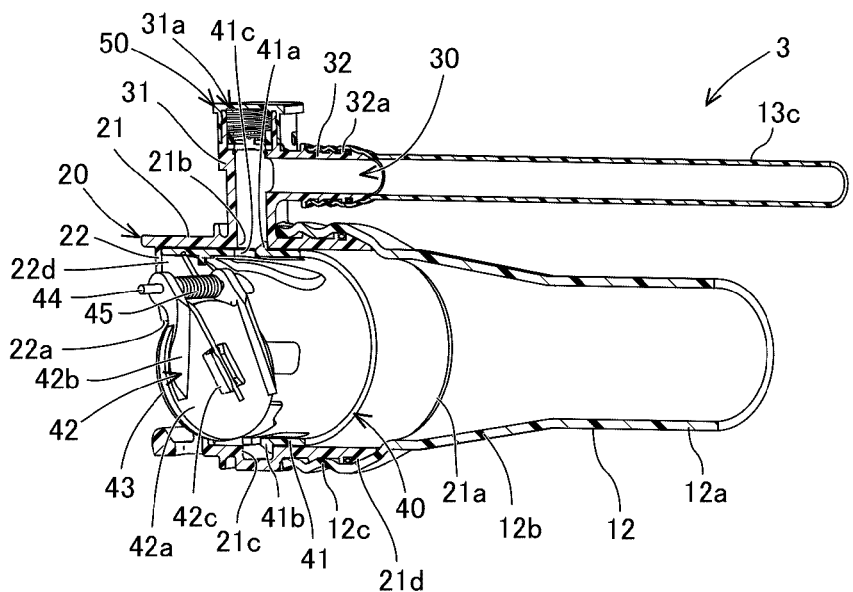
FIG. 4 is a perspective view of the capless oil feeder cut in the axial direction, as viewed from the side of the fuel feed port.

As shown in FIG. 2 to FIG. 4, the oil filler port 11 includes the oil filler port main body 20 made of the resin, the breather tube portion 30 made of the resin, a flap valve unit 40, and the positive pressure relief valve 50. The oil filler port main body 20 and the breather tube portion 30 are integrally formed of the resin. In other words, the oil filler port main body 20 and the breather tube portion 30 are formed as one member, and do not have a component joining portion in the case of being formed by multiple members.

The oil filler port main body 20 includes a main tube portion 21 and a nozzle insertion portion 22. The main tube portion 21 has openings at two ends, which penetrate the main tube portion 21 in the axial direction. One end side (the left side in FIG. 2 to FIG. 5) of the main tube portion 21 is positioned on the outer surface side of the automobile while the other end side (the right side in FIG. 2 to FIG. 5) of the main tube portion 21 is positioned on the side of the fuel tank 2. The main tube portion 21 has a fuel feed port 21a for supplying fuel to the filler tube 12 on the other end side, and a circulation port 21b that opens upward near the center in the axial direction.

The entire main tube portion 21 is formed in a tubular shape that has a substantially uniform diameter in the axial direction. More specifically, the inner peripheral surface of the main tube portion 21 is formed with a uniform diameter in the axial direction at least from the part of the circulation port 21b to the fuel feed port 21a. In addition, a recess 21c that has the same shape as the circulation port 21b is formed on the inner peripheral surface of the main tube portion 21 at a position facing the circulation port 21b, that is, at a lower position. The recess 21c is formed by disposing the tip portion of a mold that is for forming the circulation port 21b. The recess 21c functions as a part to be engaged with an elastic claw 41b, which will be described later.

Furthermore, on the outer peripheral surface of the main tube portion 21, a tube engaging portion 21d is formed on the side of the fuel feed port 21a with respect to the circulation port 21b. The tube engaging portion 21d has a bamboo-shoot shape. That is, the tube engaging portion 21d has a plurality of concaves and convexes in the axial direction. The filler tube 12 is fitted to the tube engaging portion 21d. Therefore, the tube engaging portion 21d prevents the filler tube 12 from coming off the main tube portion 21. In addition, an O-ring is fitted to the recess of the tube engaging portion 21d. In other words, the O-ring seals between the tube engaging portion 21d and the filler tube 12.

The nozzle insertion portion 22 is disposed inside the main tube portion 21 on one end side (the left side in FIG. 2 to FIG. 5) with respect to the circulation port 21b. The nozzle insertion portion 22 has a nozzle insertion port 22a that is smaller than the inner diameter of the main tube portion 21. The nozzle insertion portion 22 includes a disk-shaped portion 22b and a tubular portion 22c. The disk-shaped portion 22b has a circular hole at a position decentered downward. The tubular portion 22c extends in the axial direction from the circular hole of the disk-shaped portion 22b toward the side of the fuel feed port 21a (the right side in FIG. 2 to FIG. 5). In other words, the tubular portion 22c forms the nozzle insertion port 22a. The tip of the oil filler nozzle 4 can be inserted into the tubular portion 22c that serves as the nozzle insertion port 22a.

Moreover, the nozzle insertion portion 22 has an annular recess 22d that is on the outer peripheral side of the tubular portion 22c and on the side of the fuel feed port 21a (the right side in FIG. 2 to FIG. 5) of the disk-shaped portion 22b. The end portion of a unit housing 41 of the flap valve unit 40 enters the annular recess 22d, and the unit housing 41 is positioned inside the oil filler port main body 20. In addition, a rod member 44 and a coil spring 45 of the flap valve unit 40 are disposed in the annular recess 22d.

The breather tube portion 30 has a tubular shape and is formed integrally on the outer side of the peripheral surface of the oil filler port main body 20. One end of the breather tube portion 30 is connected to the circulation port 21b of the oil filler port main body 20 and the other end is connected to the breather tube 13c. The breather tube portion 30 includes a main body coupling portion 31 and a breather connection portion 32. In this exemplary embodiment, the main body coupling portion 31 and the breather connection portion 32 are formed in an L shape.

The main body coupling portion 31 is formed to extend outward in the radial direction and upward from the peripheral surface of the main tube portion 21 of the oil filler port main body 20. In particular, the main body coupling portion 31 is disposed to extend in a direction orthogonal to the axial direction of the main tube portion 21 of the oil filler port main body 20. Nevertheless, the main body coupling portion 31 may also extend in a direction inclined with respect to the axial direction of the main tube portion 21.

The breather connection portion 32 is bent from an end of the main body coupling portion 31. In this exemplary embodiment, the breather connection portion 32 is bent to be substantially orthogonal to the main body coupling portion 31. A tube engaging portion 32a is formed on the outer peripheral surface of the breather connection portion 32. The tube engaging portion 32a has a bamboo-shoot shape. That is, the tube engaging portion 32a has a plurality of concaves and convexes in the axial direction. The breather tube 13c is fitted to the tube engaging portion 32a. Therefore, the tube engaging portion 32a prevents the breather tube 13c from coming off the breather connection portion 32. In addition, an O-ring is fitted to the recess of the tube engaging portion 32a. In other words, the O-ring seals between the tube engaging portion 32a and the breather tube 13c.

Furthermore, an opening 31a which goes upward is formed at the bent position where the main body coupling portion 31 and the breather connection portion 32 are connected, i.e., the upper end of the main body coupling portion 31. The positive pressure relief valve 50 is disposed in the opening 31a. In other words, the opening 31a functions as a part for releasing the internal pressure when the inside of the oil filler port main body 20 reaches a predetermined positive pressure value or higher.

Figure 5:
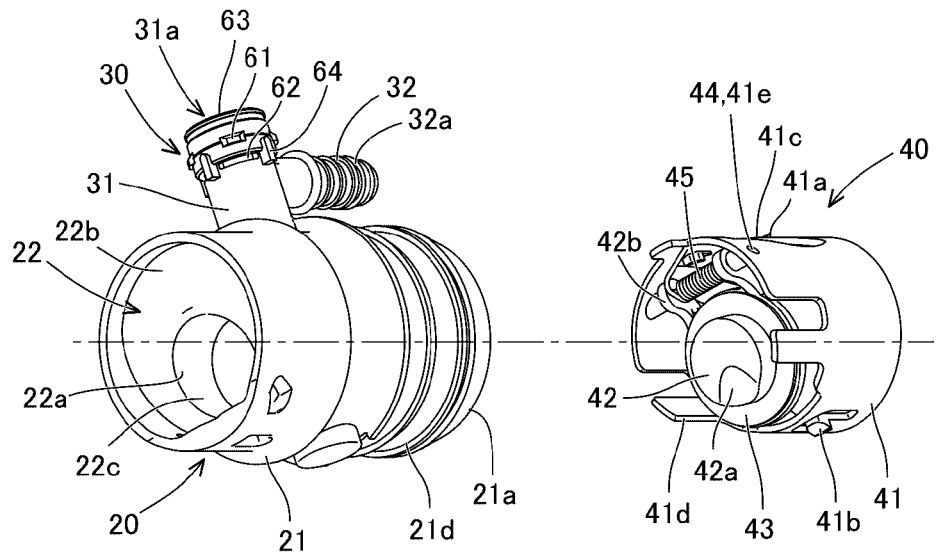
FIG. 5 is a view showing components of the oil filler port, and showing the oil filler port main body and the breather tube portion on the left side of the figure and showing the flap valve unit on the right side of the figure.

As shown in FIG. 5, the flap valve unit 40 has a flap valve 42, and is a unit that is assembled separately from the oil filler port main body 20 and disposed inside the oil filler port main body 20. The flap valve unit 40 includes the unit housing 41, the flap valve 42, a sealing member 43, the rod member 44, and the coil spring 45.

The unit housing 41 has a substantially tubular shape as shown in FIG. 5. The outer diameter of the tubular shape of the unit housing 41 is formed to be substantially the same as the inner diameter of the main tube portion 21 of the oil filler port main body 20 and is formed to be insertable from the fuel feed port 21a. Then, as shown in FIG. 2 to FIG. 4, the unit housing 41 is housed inside the oil filler port main body 20.

The unit housing 41 has elastic claws 41a and 41b on the upper and lower sides of the peripheral surface near the middle in the axial direction. The elastic claws 41a and 41b are claws that protrude outward in the radial direction. The elastic claw 41a on the upper side is engaged with the circulation port 21b of the main tube portion 21 of the oil filler port main body 20. The elastic claw 41b on the lower side is engaged with the recess 21c of the main tube portion 21 of the oil filler port main body 20.

The unit housing 41 at least has a through hole 41c (as shown in FIG. 2 to FIG. 4) that penetrates in the radial direction around the elastic claw 41a on the upper side. The through hole 41c is at a position corresponding to the circulation port 21b. In other words, the through hole 41c communicates the inside of the breather tube portion 30 and the inside of the unit housing 41.

The unit housing 41 has a notch 41d below one end side (the left side in FIG. 5). The notch 41d is for facilitating assembly of the flap valve 42. The unit housing 41 has a pair of through holes 41e that penetrates the upper part of the peripheral surface on one end side (the left side in FIG. 5). The pair of through holes 41e is for inserting the rod member 44, which will be described later.

The flap valve 42 is disposed inside the unit housing 41 on one end side (the left side in FIG. 5) of the unit housing 41. The flap valve 42 is disposed inside the oil filler port main body 20 in a state of being attached to the unit housing 41. In other words, the flap valve 42 is formed to be insertable from the fuel feed port 21a. In addition, as shown in FIG. 2 to FIG. 4, the flap valve 42 is disposed inside the oil filler port main body 20, so as to close the nozzle insertion port 22a. The flap valve 42 is opened by insertion of the oil filler nozzle 4.

The flap valve 42 includes a flap valve main body 42a, a pair of arm portions 42b, and a spring receiving member 42c. The flap valve main body 42a has a hat shape. In a state where the flap valve 42 closes the nozzle insertion port 22a, a collar part of the flap valve main body 42a faces the end surface of the tubular portion 22c of the nozzle insertion portion 22. Meanwhile, in this state, a central convex part of the flap valve main body 42a enters the tubular portion 22c of the nozzle insertion portion 22 and faces the outer surface side of the automobile. In other words, the central convex part of the flap valve main body 42a is the part that comes into contact with the end portion of the oil filler nozzle 4.

As shown in FIG. 4 and FIG. 5, the pair of arm portions 42b is formed to extend upward from the back surface (the right side in FIG. 4 and FIG. 5) of the flap valve main body 42a. At the tips of the pair of arm portions 42b, through holes are formed and are located coaxially with the pair of through holes 41e of the unit housing 41. As shown in FIG. 4, the spring receiving member 42c is disposed on the back surface (the right side in FIG. 4) of the flap valve main body 42a and holds one end of the coil spring 45.

The sealing member 43 has an annular shape. As shown in FIG. 2 to FIG. 3 and FIG. 5, the sealing member 43 is disposed over the entire circumference on the front surface side (the left side in FIG. 2) of the collar part of the flap valve main body 42a. Then, as shown in FIG. 2 and FIG. 3, the sealing member 43 is held between the end surface of the tubular portion 22c of the nozzle insertion portion 22 and the collar part of the flap valve main body 42a. In other words, the sealing member 43 seals between the end surface of the tubular portion 22c of the nozzle insertion portion 22 and the collar part of the flap valve main body 42a.

As shown in FIG. 2 to FIG. 5, the rod member 44 is held in a state of being inserted through the pair of through holes 41e of the unit housing 41 and the through holes of the pair of arm portions 42b. In other words, the flap valve 42 is supported to be swingable around the rod member 44 with respect to the unit housing 41.

As shown in FIG. 3 to FIG. 5, the coil spring 45 is mounted on the outer periphery of the rod member 44. One end of the coil spring 45 is held by the spring receiving member 42c of the flap valve 42. In other words, one end of the coil spring 45 presses the flap valve 42 toward the side of the nozzle insertion port 22a. Meanwhile, the other end of the coil spring 45 presses the upper surface side of the inner peripheral surface of the unit housing 41.

Therefore, as a normal state, the coil spring 45 presses the flap valve 42 against the end surface side of the tubular portion 22c of the nozzle insertion portion 22 so that the sealing member 43 is held between the tubular portion 22c of the nozzle insertion portion 22 and the collar part of the flap valve main body 42a by a pressure equal to or higher than a predetermined pressure. On the other hand, when the flap valve main body 42a receives the pressing force from the oil filler nozzle 4, the flap valve main body 42a is opened against the spring force of the coil spring 45.

As shown in FIG. 2, the positive pressure relief valve 50 is provided in the breather tube portion 30. In particular, the positive pressure relief valve 50 is provided at the upper end of the breather tube portion 30 and is provided at the bent part where the main body coupling portion 31 and the breather connection portion 32 are connected. The positive pressure relief valve 50 releases the internal pressure when the inside of the oil filler port main body 20 reaches the predetermined positive pressure value or higher. Details of the positive pressure relief valve 50 will be described later.

The filler tube 12 is made of the resin. As shown in FIG. 2 to FIG. 4, the filler tube 12 includes a small-diameter tube portion 12a, a tapered tube portion 12b, and a fitting portion 12c. The small-diameter tube portion 12a is the major part of the axial center of the filler tube 12. In other words, the small-diameter tube portion 12a is located in the major part between the oil filler port 11 and the fuel tank 2. The inner diameter of the small-diameter tube portion 12a is determined according to the flow rate, etc. of the liquid fuel.

The tapered tube portion 12b is a part connected to the end portion of the small-diameter tube portion 12a, and is expanded from the small-diameter tube portion 12a. The tapered tube portion 12b has a function corresponding to the tapered part of the known oil filler port. In other words, the tapered tube portion 12b serves as a connection part for improving flow of the liquid fuel from the oil filler port 11 to the small-diameter tube portion 12a. The inner diameter of the large-diameter end portion of the tapered tube portion 12b is substantially the same as the inner diameter of the main tube portion 21 of the oil filler port main body 20.

The fitting portion 12c is connected to the large-diameter end portion of the tapered tube portion 12b and is fitted to the tube engaging portion 21d formed on the outer peripheral surface of the main tube portion 21 of the oil filler port main body 20. The fitting portion 12c has an inner diameter that is slightly smaller than the outer diameter of the tube engaging portion 21d before being fitted to the tube engaging portion 21d. Therefore, when the fitting portion 12c is fitted to the tube engaging portion 21d, the filler tube 12 is prevented from coming off the oil filler port main body 20.

The breather tube 13c is made of the resin and is formed into a tubular shape that has a substantially uniform diameter over the entire length. The inner diameter of the breather tube 13c is slightly smaller than the outer diameter of the tube engaging portion 32a of the breather connection portion 32. An end portion of the breather tube 13c is fitted to the tube engaging portion 32a. Therefore, the tube engaging portion 32a prevents the breather tube 13c from coming off the breather connection portion 32.

(3. Operation of the Capless Oil Feeder 3 During Oil Feeding)

The operation of the capless oil feeder 3 during oil feeding is described with reference to FIG. 2 and FIG. 6. When oil feeding is not performed, as shown in FIG. 2, the flap valve main body 42a closes the nozzle insertion port 22a with the sealing member 43. More specifically, due to the spring force of the coil spring 45, the flap valve main body 42a is pressed against the tubular portion 22c of the nozzle insertion portion 22.

Figure 6:
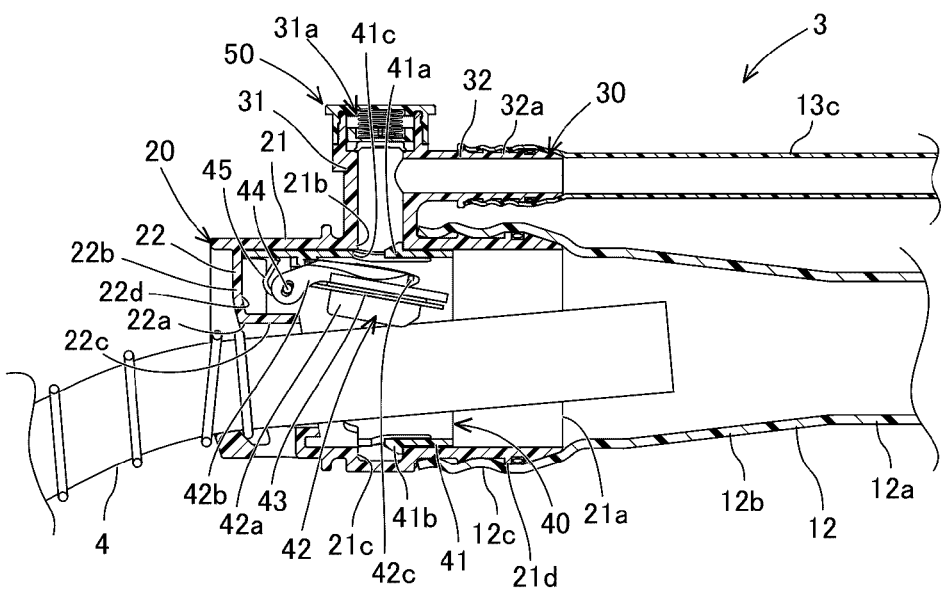
FIG. 6 is a cross-sectional view of the capless oil feeder in the axial direction in a state where the oil filler nozzle is inserted.

On the other hand, when oil feeding is performed, as shown in FIG. 6, the oil filler nozzle 4 is inserted into the oil filler port main body 20. At this time, the tip of the oil filler nozzle 4 presses the flap valve main body 42a. The pressing force from the oil filler nozzle 4 is applied against the spring force of the coil spring 45 to cause the flap valve main body 42a to swing around the rod member 44. Then, the flap valve main body 42a and the sealing member 43 are separated from the tubular portion 22c of the nozzle insertion portion 22 and the nozzle insertion port 22a is opened.

(4. Configuration of the Positive Pressure Relief Valve 50)

Figure 7:
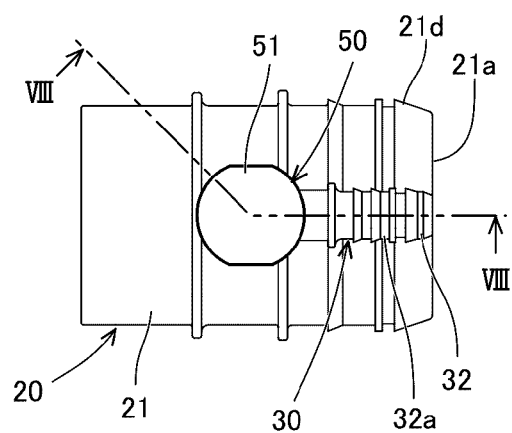
FIG. 7 is a plan view of the oil filler port main body.

The detailed configuration of the positive pressure relief valve 50 and the opening 31a of the main body coupling portion 31 of the breather tube portion 30 is described with reference to FIG. 5, FIG. 7, and FIG. 8.

Figure 8:
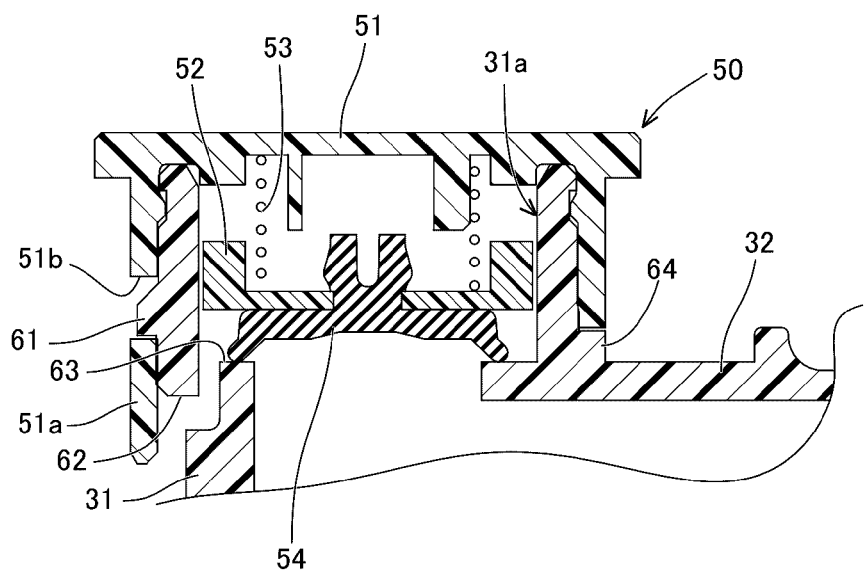
FIG. 8 is an enlarged cross-sectional view of the positive pressure relief valve, which corresponds to the VIII-VIII cross-section of FIG. 7.

As shown in FIG. 5 and FIG. 8, the opening 31a of the main body coupling portion 31 has a plurality of claws 61 arranged at equal intervals in the circumferential direction on the outer peripheral surface. In addition, the opening 31a has a plurality of ventilation holes 62 arranged at equal intervals in the circumferential direction on the root side of the claws 61. The ventilation holes 62 penetrate the inside and the outside. The opening 31a further has an annular sealing seat surface 63 on the inner side of the ventilation holes 62. Furthermore, a positioning protrusion 64 is provided between adjacent ventilation holes 62 on the outer peripheral surface of the opening 31a.

The positive pressure relief valve 50 includes a lid member 51, a valve main body 52, a spring 53, and a sealing member 54. The lid member 51 is formed into a bottomed tubular shape and covers the opening 31a of the main body coupling portion 31. A skirt portion 51a of the lid member 51 has a tubular shape that extends downward. In other words, the skirt portion 51a covers the outer periphery of the opening 31a of the main body coupling portion 31. More specifically, the lower edge of the skirt portion 51a is positioned below the ventilation holes 62. Besides, through holes 51b are formed in the skirt portion 51a of the lid member 51 at equal intervals in the circumferential direction. The through holes 51b are engaged with the claws 61 of the opening 31a of the main body coupling portion 31.

The valve main body 52 is disposed inside the lid member 51 and is disposed to be movable between the bottom portion of the lid member 51 and the sealing seat surface 63 of the main body coupling portion 31. The spring 53 is disposed between the bottom portion of the lid member 51 and the valve main body 52 and presses the valve main body 52 toward the side of the sealing seat surface 63.

The sealing member 54 has an annular shape and is attached to the valve main body 52 to face the sealing seat surface 63. As shown in FIG. 8, the sealing member 54 is pressed against the sealing seat surface 63 by a predetermined pressure due to the spring force of the spring 53. In other words, the sealing member 54 seals between the sealing seat surface 63 and the valve main body 52.

(5. Operation of the Positive Pressure Relief Valve 50)

Next, the operation of the positive pressure relief valve 50 is described with reference to FIG. 8 and FIG. 9. When the inside of the oil filler port main body 20 is lower than the predetermined positive pressure value, the sealing member 54 is in contact with the sealing seat surface 63, as shown in FIG. 8. Therefore, the inside and the outside of the breather tube portion 30 do not communicate with each other.

Figure 9:
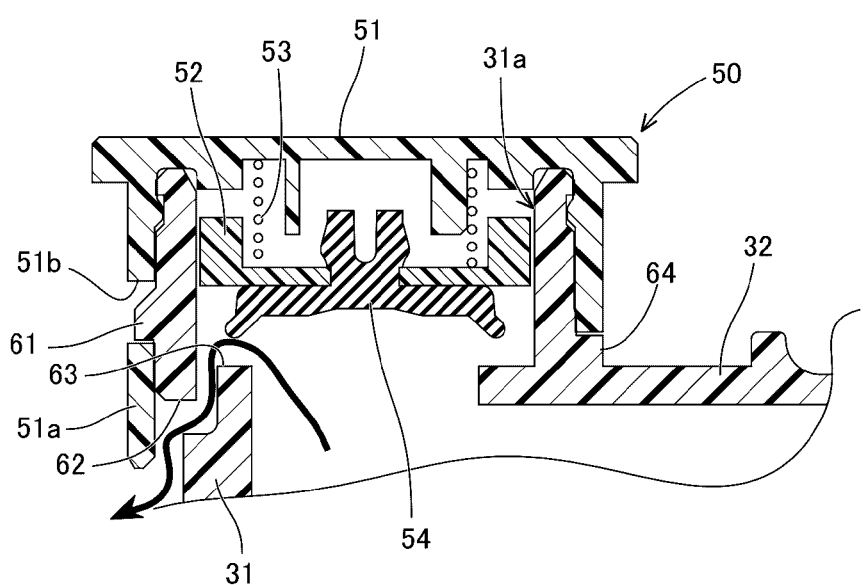
FIG. 9 is a view of a state where the positive pressure relief valve is in operation.

On the other hand, when the inside of the oil filler port main body 20 reaches the predetermined positive pressure value or higher, the valve main body 52 and the sealing member 54 move toward the side of the bottom portion of the lid member 51 against the spring force of the spring 53, as shown in FIG. 9. Then, when the sealing member 54 separates from the sealing seat surface 63, the fluid inside the breather tube portion 30 moves between the sealing member 54 and the sealing seat surface 63, the ventilation holes 62 of the main body coupling portion 31, and the lower edge of the skirt portion 51a in this order and flows to the outside of the breather tube portion 30. In this manner, the internal pressure inside the oil filler port main body 20 is reduced.

(6. Manufacturing Method of the Capless Oil Feeder 3)

Next, a manufacturing method of the capless oil feeder 3 is described with reference to FIG. 5 and FIG. 8. As shown on the left side of FIG. 5, the oil filler port main body 20 and the breather tube portion 30 are integrally formed as one part by injection molding. Then, as shown in FIG. 8, the positive pressure relief valve 50 is mounted on the opening 31a of breather tube portion 30.

Meanwhile, as shown on the right side of FIG. 5, the flap valve unit 40 is assembled. That is, the flap valve 42, the sealing member 43, the rod member 44, and the coil spring 45 are mounted in the unit housing 41. Then, in the oil filler port main body 20, the flap valve unit 40 is inserted from the side of the fuel feed port 21a, and the elastic claws 41a and 41b are engaged with the circulation port 21b and the recess 21c. Thereafter, the fitting portion 12c of the filler tube 12 is fitted to the tube engaging portion 21d of the oil filler port main body 20. Further, the breather tube 13c is fitted to the breather connection portion 32. In this manner, the capless oil feeder 3 is assembled.

(7. Effects of this Exemplary Embodiment)

The capless oil feeder 3 described above includes the oil filler port 11 made of a resin, the filler tube 12 connected to the oil filler port 11, and the breather tube 13c connected to the oil filler port 11.

The oil filler port 11 includes the oil filler port main body 20 made of the resin, the breather tube portion 30 made of the resin, and the flap valve 42. The oil filler port main body 20 has a tubular shape and includes the nozzle insertion port 22a for inserting the oil filler nozzle 4 at one end and the fuel feed port 21a for supplying fuel to the filler tube 12 at the other end. The breather tube portion 30 is formed integrally on the outer side of the peripheral surface of the oil filler port main body 20 and is connected to the breather tube 13c. The flap valve 42 is formed to be insertable from the fuel feed port 21a, and is disposed inside the oil filler port main body 20 to close the nozzle insertion port 22a and is opened by insertion of the oil filler nozzle 4.

The capless oil feeder 3 includes the oil filler port main body 20 that supports the flap valve 42 and is connected to the filler tube 12. The oil filler port main body 20 is integrally formed. In other words, the support member that supports the flap valve 42 and the passage forming member in the related art correspond to the oil filler port main body 20. In other words, the oil filler port main body 20 of this exemplary embodiment is integrally formed, as compared with the related art where the support member and the passage forming member are formed separately. Since the oil filler port main body 20 is formed integrally, it is not required to carry out sealing by welding and sealing with a sealing member. As a result, elimination of the need for sealing can reduce the production costs.

Moreover, in this exemplary embodiment, the filler tube 12 includes the small-diameter tube portion 12a, the tapered tube portion 12b that is connected to the end portion of the small-diameter tube portion 12a and expanded from the small-diameter tube portion 12a, and the fitting portion 12c that is connected to the large-diameter end portion of the tapered tube portion 12b and fitted to the outer peripheral surface of the oil filler port main body 20. Accordingly, the flow of liquid fuel from the oil filler port main body 20 to the small-diameter tube portion 12a can be improved while the fuel feed port 21a is enlarged.

Besides, the inner peripheral surface of the oil filler port main body 20 is formed with a uniform diameter in the axial direction from the part of the circulation port 21b, to which the breather tube portion 30 is connected, to the fuel feed port 21a. Therefore, the fuel feed port 21a can certainly be enlarged. Accordingly, it is easy to insert the flap valve 42 from the fuel feed port 21a to mount the flap valve 42 inside the oil filler port main body 20.

In addition, the capless oil feeder 3 includes the positive pressure relief valve 50 that is provided in the breather tube portion 30. Conventionally, the positive pressure relief valve 50 is provided in the flap valve 42. In this exemplary embodiment, however, the positive pressure relief valve 50 is not provided in the flap valve 42. Thus, the flap valve 42 itself can be downsized. As a result, it is easy to insert the flap valve 42 from the fuel feed port 21a to mount the flap valve 42 inside the oil filler port main body 20.

Furthermore, the positive pressure relief valve 50 is mounted on the upper end of the breather tube portion 30, and the positive pressure relief valve 50 includes the skirt portion 51a having a tubular shape that extends downward. Then, a flow passage is formed between the lower edge of the skirt portion 51a and the breather tube portion 30. Since the flow passage is around the lower edge of the skirt portion 51a, dust is prevented from entering the inside of the breather tube portion 30.

In addition, the breather tube portion 30 includes the main body coupling portion 30 that extends outward in the radial direction and upward from the peripheral surface of the oil filler port main body 20; and the breather connection portion 32 that is bent from an end of the main body coupling portion 31 and connected to the breather tube 13c. As a result, hindrance to the flow of fuel in the oil filler port main body 20 due to circulation from the breather tube 13c is suppressed. Moreover, when fuel supply from the oil filler nozzle 4 stops, regurgitation from the breather tube portion 30 toward the side of the nozzle insertion port 22a is suppressed.

In this case, the positive pressure relief valve 50 is provided at the bent position where the main body coupling portion 31 and the breather connection portion 32 are connected. Therefore, it is easy to dispose the positive pressure relief valve 50. The angle at which the main body coupling portion 31 enters the oil filler port main body 20 can also be increased.

In addition, the oil filler port 11 includes the flap valve unit 40 that is disposed inside the oil filler port main body 20. The flap valve unit 40 includes the unit housing 41 having a tubular shape and the flap valve 42. The unit housing 41 is formed to be insertable from the fuel feed port 21a and housed inside the oil filler port main body 20. The flap valve 42 is supported inside the unit housing 41 to open or close the nozzle insertion port 22a.

In a state where the flap valve 42 has been mounted in the unit housing 41 in advance, the unit housing 41 can be mounted inside the oil filler port main body 20. Accordingly, it is easy to mount the flap valve 42 inside the oil filler port main body 20.

The unit housing 41 further has the through holes 41e on the peripheral surface. Then, the flap valve unit 40 includes the rod member 44 and the coil spring 45. The rod member 44 is held in a state of being inserted into the through holes 41e of the unit housing 41. The coil spring 45 is mounted on the outer periphery of the rod member 44. One end of the coil spring 45 presses the flap valve 42 toward the side of the nozzle insertion port 22a and the other end presses the inner peripheral surface of the unit housing 41.

It is very easy to dispose the rod member 44 into the through holes 41e of the unit housing 41. Accordingly, it is easy to dispose the flap valve 42, the rod member 44, and the coil spring 45 in the unit housing 41. Here, the other end of the coil spring 45 may be pressed against the inner peripheral surface of the oil filler port main body 20, instead of the inner peripheral surface of the unit housing 41. In that case, the same effects are also achieved.

Here, in the exemplary embodiment described above, the flap valve 42 is mounted in the unit housing 41 in advance to constitute the flap valve unit 40. Nevertheless, the flap valve 42 may be directly mounted in the oil filler port main body 20. In that case, however, it is also necessary to insert the rod member 44 from the fuel feed port 21a of the oil filler port main body 20 to dispose the rod member 44 inside the oil filler port main body 20.

As described above, since the oil filler port 11 includes the flap valve unit 40, it is very easy to dispose the rod member 44 in the unit housing 41. The reason is provided in detail below. The flap valve unit 40 is a member to be disposed inside the oil filler port main body 20. Therefore, formation of the through holes 41e in the unit housing 41 that constitutes the flap valve unit 40 has no influence on the performance to serve as the oil filler port 11. Then, the rod member 44 can be inserted into the through holes 41e from outside the unit housing 41. Accordingly, it is very easy to dispose the rod member 44.

In addition, the manufacturing method of the capless oil feeder 3 includes: integrally forming the oil filler port main body 20 and the breather tube portion 30; and inserting the flap valve 42 from the fuel feed port 21a to dispose the flap valve 42 inside the oil filler port main body 20. In this manner, the capless oil feeder 3 is manufactured reliably.

What is claimed is:

1. A capless oil feeder comprising an oil filler port made of a resin, a filler tube connected to the oil filler port, and a breather tube connected to the oil filler port, wherein:
   the oil filler port comprises:
   an oil filler port main body made of the resin, wherein the oil filler port main body has a tubular shape and comprises a nozzle insertion port for inserting an oil filler nozzle at one end and a fuel feed port for supplying fuel to the filler tube at the other end;
   a breather tube portion made of the resin, wherein the breather tube portion is formed integrally on an outer side of a peripheral surface of the oil filler port main body and connected to the breather tube;
   a flap valve formed to be insertable from the fuel feed port, wherein the flap valve is disposed inside the oil filler port main body to close the nozzle insertion port and is opened by insertion of the oil filler nozzle; and
   a positive pressure relief valve that is provided in the breather tube portion,
   wherein the positive pressure relief valve is mounted on an upper end of the breather tube portion,
   the positive pressure relief valve comprises a skirt portion having a tubular shape that extends downward, and
   a flow passage is formed between a lower edge of the skirt portion and the breather tube portion.

2. The capless oil feeder according to claim 1, wherein the filler tube comprises a small-diameter tube portion, a tapered tube portion that is connected to an end portion of the small-diameter tube portion and expanded from the small-diameter tube portion, and a fitting portion that is connected to a large-diameter end portion of the tapered tube portion and fitted to an outer peripheral surface of the oil filler port main body.

3. The capless oil feeder according to claim 1, wherein the oil filler port main body has an inner peripheral surface that is formed with a uniform diameter in an axial direction from a part of a circulation port, to which the breather tube portion is connected, to the fuel feed port.

4. The capless oil feeder according to claim 1, wherein the breather tube portion comprises:
   a main body coupling portion that extends outward in a radial direction and upward from the peripheral surface of the oil filler port main body; and
   a breather connection portion that is bent from an end of the main body coupling portion and connected to the breather tube,
   wherein the positive pressure relief valve is provided at a bent position where the main body coupling portion and the breather connection portion are connected.

5. The capless oil feeder according to claim 1, wherein the breather tube portion comprises:
   a main body coupling portion that extends outward in a radial direction from the peripheral surface of the oil filler port main body; and
   a breather connection portion that is bent from an end of the main body coupling portion and connected to the breather tube.

6. The capless oil feeder according to claim 1, wherein the oil filler port comprises a flap valve unit disposed inside the oil filler port main body, and
   the flap valve unit comprises:
   a unit housing having a tubular shape, wherein the unit housing is formed to be insertable from the fuel feed port and housed inside the oil filler port main body; and
   the flap valve supported inside the unit housing to open or close the nozzle insertion port.

7. The capless oil feeder according to claim 6, wherein the unit housing has a through hole on a peripheral surface, and
   the flap valve unit comprises:
   a rod member held in a state of being inserted into the through hole of the unit housing; and
   a coil spring mounted on an outer periphery of the rod member, wherein the coil spring presses one end against the flap valve toward a nozzle insertion port side and presses the other end against an inner peripheral surface of the unit housing or the oil filler port main body.

8. A manufacturing method of the capless oil feeder according to claim 1, comprising:
   integrally forming the oil filler port main body and the breather tube portion; and
   inserting the flap valve from the fuel feed port to dispose the flap valve inside the oil filler port main body.

9. A capless oil feeder comprising an oil filler port made of a resin, a filler tube connected to the oil filler port, and a breather tube connected to the oil filler port, wherein:
   the oil filler port comprises:
   an oil filler port main body made of the resin, wherein the oil filler port main body has a tubular shape and comprises a nozzle insertion port for inserting an oil filler nozzle at one end and a fuel feed port for supplying fuel to the filler tube at the other end;
   a breather tube portion made of the resin, wherein the breather tube portion is formed integrally on an outer side of a peripheral surface of the oil filler port main body and connected to the breather tube; and
   a flap valve formed to be insertable from the fuel feed port, wherein the flap valve is disposed inside the oil filler port main body to close the nozzle insertion port and is opened by insertion of the oil filler nozzle, wherein the oil filler port comprises a flap valve unit disposed inside the oil filler port main body, and the flap valve unit comprises:

a unit housing having a tubular shape, wherein the unit housing is formed to be insertable from the fuel feed port and housed inside the oil filler port main body; and the flap valve supported inside the unit housing to open or close the nozzle insertion port, wherein the unit housing has a through hole on a peripheral surface, and the flap valve unit comprises:

a rod member held in a state of being inserted into the through hole of the unit housing; and a coil spring mounted on an outer periphery of the rod member, wherein the coil spring presses one end against the flap valve toward a nozzle insertion port side and presses the other end against an inner peripheral surface of the unit housing or the oil filler port main body.

\* \* \* \* \*